United States Patent [19]

Raggiotti

[11] Patent Number: 4,784,192
[45] Date of Patent: Nov. 15, 1988

[54] PORTABLE RADIAL ARM MACHINE WITH AN ADJUSTABLE OVERALL DIMENSION

[76] Inventor: Guglielmo Raggiotti, Via Della Gabbia, 11, 06100 Perugia, Italy

[21] Appl. No.: 678,378

[22] Filed: Dec. 5, 1984

Related U.S. Application Data

[63] Continuation of Ser. No. 418,671, Sep. 16, 1982, abandoned.

[30] Foreign Application Priority Data

Sep. 16, 1981 [IT] Italy ................. 43515 A/81

[51] Int. Cl.[4] ................................. B27B 5/00
[52] U.S. Cl. .................... 144/35 A; 83/701; 83/471.3; 83/473; 83/524
[58] Field of Search ............. 83/701, 859, 860, 471.3, 83/473, 486.1, 488, 522, 574; 144/286 R, 1 C, 1 H, 134 B, 35 A

[56] References Cited

U.S. PATENT DOCUMENTS

| | | |
|---|---|---|
| 1,756,121 | 4/1930 | Hedgpeth . |
| 1,779,031 | 10/1930 | Casey ........................ 30/374 |
| 1,865,759 | 6/1932 | Hughes ...................... 83/574 |
| 2,200,799 | 5/1940 | Miller ....................... 144/35 A |
| 2,489,420 | 11/1949 | Kirk et al. .................. 83/486.1 |
| 2,552,234 | 5/1951 | Thibodeau ................... 74/421 A |
| 2,584,863 | 2/1952 | Gesner ....................... 83/471.3 |
| 2,696,851 | 12/1954 | Davis ............................ 143/6 |
| 2,697,460 | 12/1954 | Barnett ....................... 206/349 |
| 2,822,836 | 2/1958 | Horstmann et al. ........... 144/35 A |
| 2,835,289 | 5/1958 | Rockwell ...................... 144/1 |
| 2,851,068 | 9/1958 | Goodlet ...................... 83/471.3 |
| 2,870,801 | 1/1959 | Cravens ...................... 83/486.1 |
| 2,923,330 | 2/1960 | Rozell ........................... 144/1 |
| 2,987,083 | 6/1961 | Ross et al. ..................... 83/574 |
| 3,036,608 | 5/1962 | Weber ........................ 83/471.3 |
| 3,056,439 | 10/1962 | Hall et al. . |
| 3,080,897 | 3/1963 | Winter ....................... 144/35 A |
| 3,586,079 | 6/1971 | Collins et al. ................ 83/471.3 |
| 3,923,086 | 12/1975 | Spahn, Jr. ................... 83/471.3 |
| 4,105,055 | 8/1978 | Brenta ...................... 144/286 R |
| 4,152,961 | 5/1979 | Batson ....................... 83/486.1 |
| 4,243,083 | 1/1981 | Serrano ...................... 144/35 A |
| 4,252,239 | 2/1981 | Snyder ....................... 206/349 |
| 4,317,282 | 3/1982 | Pace ........................... 30/122 |

FOREIGN PATENT DOCUMENTS

| | | |
|---|---|---|
| 366549 | 1/1923 | Fed. Rep. of Germany ... 74/421 A |
| 948445 | 8/1956 | Fed. Rep. of Germany . |
| 2631767 | 2/1977 | Fed. Rep. of Germany . |
| 2367577 | 5/1978 | France . |

OTHER PUBLICATIONS

DeWalt Mod. 1370.
DeWalt Double Automatic.
DeWalt 10" Power Shop.

*Primary Examiner*—Donald R. Schran
*Assistant Examiner*—James L. Wolfe
*Attorney, Agent, or Firm*—John J. Bryne

[57] ABSTRACT

A portable radial arm machine having two principle components. The machine is easily disassembled and quickly assembled in either a working mode or in a compact portable mode having the characteristics of a piece of luggage so that the machine can be transported easily from location to location and readily placed in operation.

15 Claims, 3 Drawing Sheets

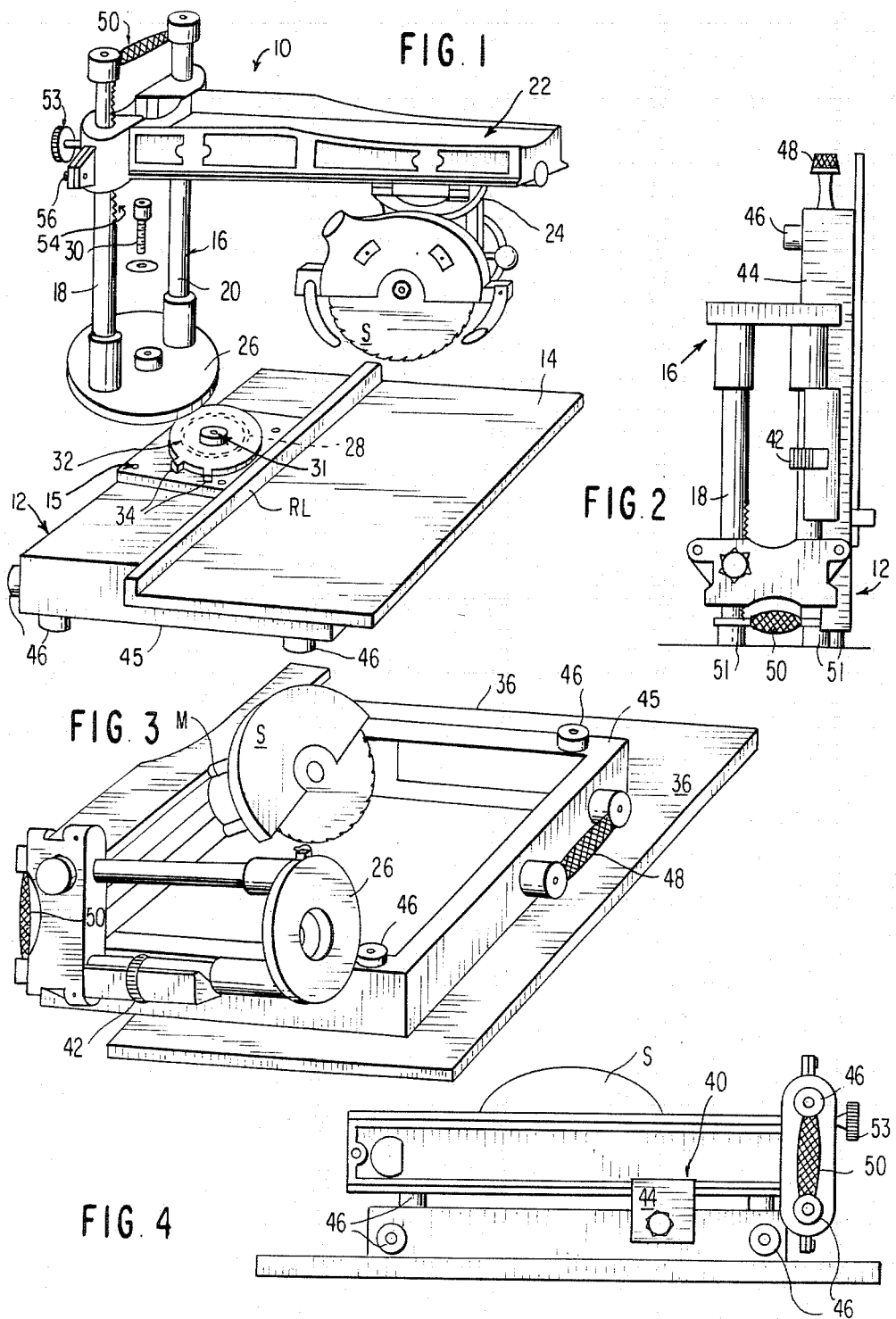

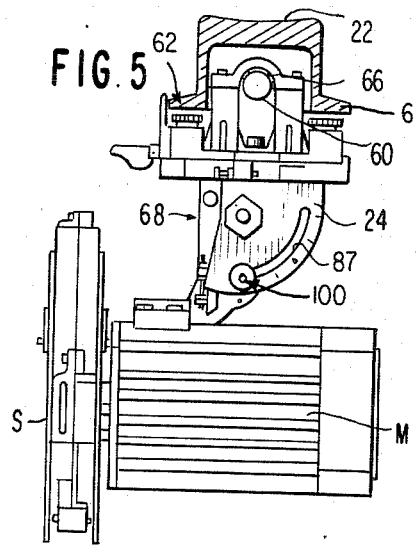
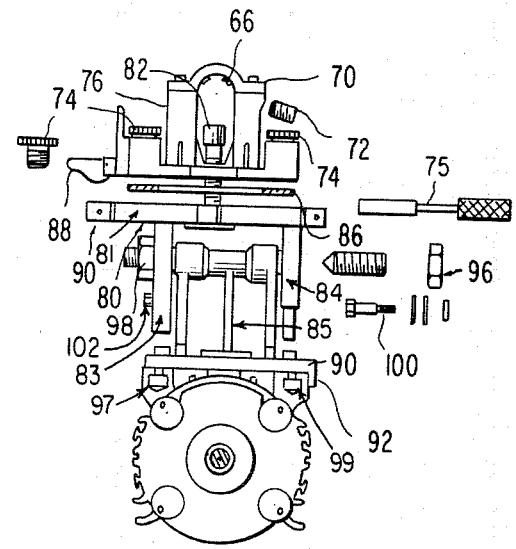
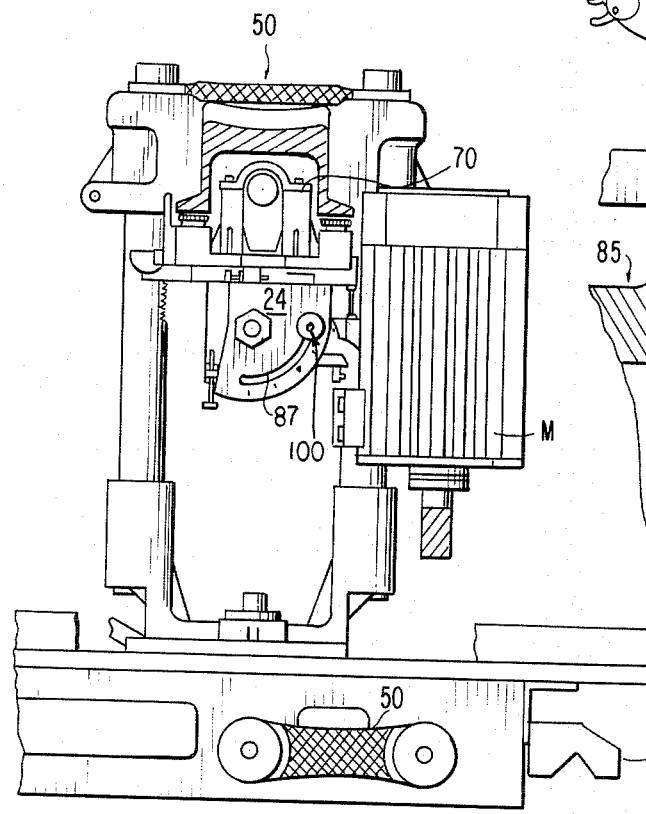

PORTABLE RADIAL ARM MACHINE WITH AN ADJUSTABLE OVERALL DIMENSION

This application is a continuation of application Ser. No. 418,671 filed Sept. 16, 1982 now abandoned.

FIELD OF INVENTION

The present invention relates to a portable radial arm saw, suitable to work on wood, light metals, plastic and the like. The invention has wide general application because, in addition to preserving the attributes and performance characteristics of known radial-arm machines it is readily assembled and disassembled into two main parts which are operably connected together by a single fastener.

BACKGROUND OF INVENTION

Radial arm saws are well known and in well developed art. However, prior to this invention, there have been no satisfactory portable saws of the radial arm type that preserve the advantages of stationary machines and give the flexibility of use inherent in portability. The invention accomplishes its transportability and operating modes through a unique construction and arrangement of parts.

OBJECTS OF THE INVENTION

It is the principle objection of this invention to provide a radial arm saw of an easily transportability type that preserves the wide range of uses typical of prior art machines.

Another objective of this invention is to provide a radial arm saw having a double pillar standard by which the radial arm can be adjusted both in distance and angle from the work table.

A still further objective of the invention is to provide a radial arm carriage of a type having a yoke cradle assembly that pivotally supports the saw and motor mechanism whereby the saw can be set at different angles and the cradle can be swung to a position outside the yoke for ready reception of an adapter that receives a tool such as an electric drill.

Another object of the invention is to provide a device of the type described which has an arrangement of ports that permits the ready nesting thereof with handles conveniently located for easy maneuverability.

A further objective of this invention is to provide a radial arm saw with a yoke-cradle arrangement that permits the saw carriage to have a full range of positions with respect to the work table.

Another objective of the invention is to provide a yoke-type carriage for the saw assembly which can be swung out of the yoke proper so that tools, such as drills, can be adapted for use therewith without a particular space requirement.

SUMMARY OF THE INVENTION

The present invention provides a system for the easy assembling and disassembling of a radial arm machine into a working mode and into a portable mode.

As referred to hereinabove, it is particularly suitable for giving an easy portability and hide-a-way feature. By means of a single fastener, it is possible to assemble or disassemble the machine from its working mode. The system completes its portability concept by having an adapter to hold a portable drill.

Another important objective of the invention is that it gives the possibility to manufacture an efficient, rugged, portable radial arm machine at low cost.

Other features and advantages of the invention will be set forth, or apparent from, the description invention given hereafter.

BRIEF DESCRIPTION OF THE DRAWINGS

FIG. 1 is a perspective view showing the two principle elements disconnected but just prior to assembly to its working mode;

FIG. 2 is a side elevation of the elements rested for transport and standing on end;

FIG. 3 is a perspective view of the invention in its assembled mode ready for transport;

FIG. 4 is a rear elevation of FIG. 3 taken from the left of FIG. 3;

FIG. 5 is a front elevation of the top portion shown in FIG. 1;

FIG. 6 is a view showing some of the elements in expanded fashion;

FIG. 7 is a view similar to FIG. 5 with the motor moved to an alternate position;

FIG. 8 is a partial cross-section of one side of the yoke of the present invention;

DETAILED DESCRIPTION OF THE PRESENTLY PREFERRED EMBODIMENT

Figure 9:
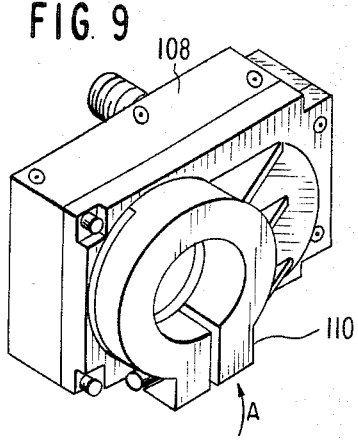
FIG. 9 is a perspective view of an adapter.
Figure 10:
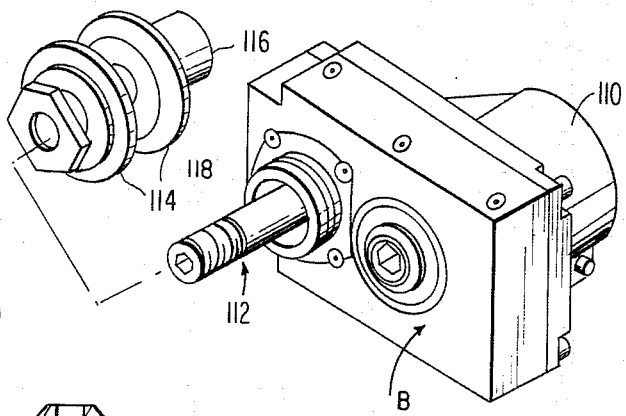
FIG. 10 is another perspective of the adapter from a different angle.

Referring now to the drawings wherein like numerals indicate like parts, the numeral 10 indicates the machine of this invention. The principle components of the machine are the base 12, having a working surface 14, a super-structure 16 having pillars or standards 18 and 20, radial arm 22 mounted to the standards and a motor carriage 24 suspended from the arm.

A plate 26 is mounted at the lower ends of standards 18 and 20 and affixed thereto. A complementary plate 28 is mounted on the upper surface of base 12 by screws 15. Plates 26 and 28 form the junction to assemble the components 12 and 16 by means of a single bolt or fastener means 30. In the working mode, components 12 and 16 are fixed by bolt 30, so that the radial arm 22 is in an elevated position over the base 12 or table 14 as seen in FIG. 1. A friction pad 32 is mounted between the two union plates 26 and 28 so that the radial arm 22 can be firmly set at different angles with respect to working table 14 by fastener 30 which, optionally may have a threaded reception aperture 31. Prefixed settings at common angles of work are possible by way of the stops 34. However, the radial arm can be disposed at any selected angle with respect to base 12.

In the portable mode, the entire superstructure 16 is assembled parallel to the base 12. The super-structure 16 may be fixed on the upper surface of base 12, or it may be fixed on the lower side 45 of base 12 by means of a bracket 38 (see FIG. 7) and two anchorages 40 and 42. The anchorage 40 is a conventional bracket jaw which can be tightened by screw 44 and anchorage 42 is a clip assembly to surround and secure standard 20.

As seen in FIG. 2, the units 12 and 16 are nested (as in FIGS. 3 and 4) and standing on end ready for transport.

FIG. 3 shows the bottom side 36 of table 14. As can be seen, the base 12 has a lower section 45 which carries a plurality of rubber supporting plugs 46 upon which the portable saw rests when in use.

A handle 48 is attached to one side of the lower section 45 to carry the unit like a suit-case when assembled. See FIG. 2. The pillars 18 and 20 have a handle 50 at their upper ends to aid in maneuvering the super-structure 16 over plate 28.

The radial arm 22 is adjustable vertically on the standards by the pinion assembly 53 and a threaded portion 54 of pillar 18. A locking bolt 56 will firmly lock the elements together when the radial arm is positioned to its desired vertical position.

The radial arm 22 has the profile of an inverted "U". A rod 60 is fixed thereto and extends longitudinal within the arm. The arm has outwardly extending flanges 62 and 64. Antifriction members 66 are provided both to join and to slide a carriage 24 along radial arm 22.

The carriage 24 includes, a collar 70, the previously mentioned antifriction members 66 and a stopping screw 72. Additional antifriction members shown as adjusting pins 74 are provided for a joining member 76 where other antifriction means are readily changeable. The suspension system further includes pivot pin 82 and a handle 75 which can be released or fixed on the member 76 and a friction ring 86 is inserted in there between. A lever 88 and stopping points 90 are available to provide prefixed settings.

The carriage 24 includes a yoke 80 having a cross member 81 and pair of plates 83 and 84 depending therefrom. The motor M is pivotally suspended by a cradle 85 between plates 83 and 84. The plates 83 and 84 are formed with opposing arcuate slots 87 by which the angle of the saw S can be set. The cradle 85 is pivotally supported by pins 96 and 98.

A saw and motor assembly are secured by adjustable screws 97 and 99 allowing the cradle 85 to swing. The cradle can be stopped at different angulations by pins 100 and 102 which are partially threaded and which have shoulders (see FIG. 8) in order to secure by tightening on the thickness of member 83 and 84 of yoke 80 via screw nuts 106. The shoulders avoid a forcing and eventually altering of the width between the two brackets.

An adapter 108 makes it possible to use a portable electric drill 111 on side A of adapter 108. The electric drill 111 with adaptor 108 can be fixed to the radial arm as an alternative to the saw and motor assembly. As seen in FIG. 9, there is a collar 110 that supports the drill. On side B of the adapter 108, there is a spindle 112. The member 116 has flanges 114 on its outer surface and a central opening to receive spindle 112.

Figure 11:
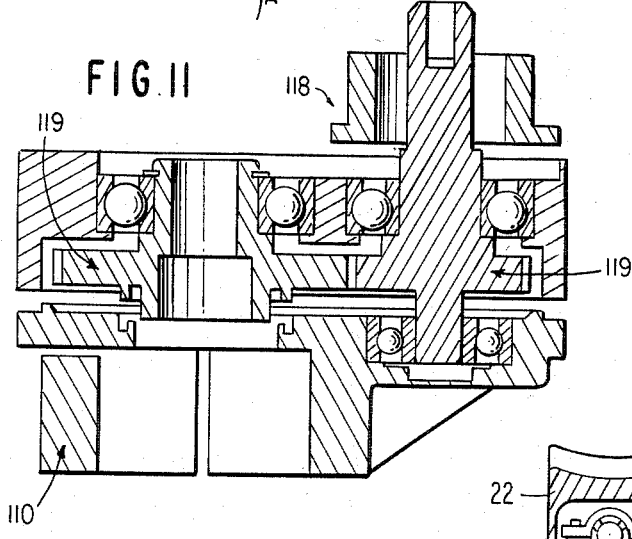
FIG. 11 is a cross-section of the supporting arrangement of the adapter.
Figure 12:
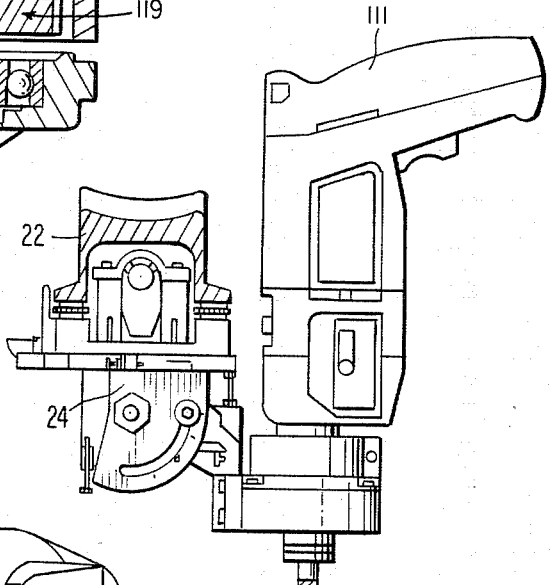
FIG. 12 is a side elevation showing a drill in the adapter.
Figure 13:
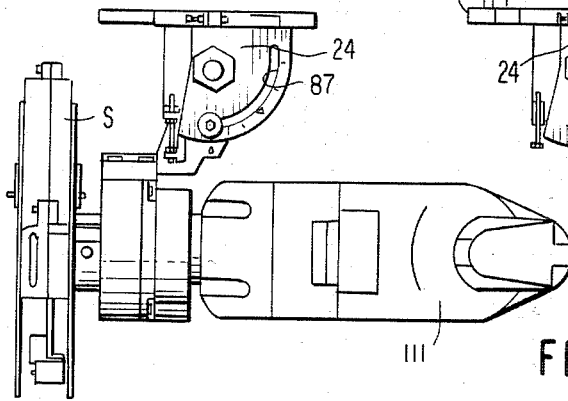
FIG. 13 is a side elevation with the drill in an alternate position.

A bracket 118 is provided for fixing safety guards where necessary. The adapter 108 can adjust the speed and of the spindle, relative to that of the drill, by means of the gears 119 shown best in FIG. 11. The adapter 108 permits the setting of the same wide variety of angles for the drill as it does for the saw. See FIG. 13 where the drill 111 has been rotated from its FIG. 12 position.

Summarizing, there has been shown a portable radial saw having two principle elements the base 12 and the superstructure 16. The two members are so arranged that the structure 16 may be readily affixed to the underside of the base 12 such that the saw and motor assembly, the heaviest components of the super-structure, are nested within the base 12 for proper balance in the transport mode. The components when nested together, have a proper weight distribution so that the machine can be stored in a very small area (FIG. 2) such as a closet. The machine is completely ready for travel by lifting handle 48. The device can be manufactured well within the weight limit of normal aircraft luggage requirements.

Once assembled, the machine provides a radial arm saw in which the carriage and the saw can be moved back and forth along the radial arm 22 in the conventional fashion. Additionally, the motor and saw assembly are suspended in a manner so that its positional attitude can assume any angular adjustability as well as movement and adjustment about its vertical axis.

Likewise by virtue of this yoke arrangement the motor can be removed, an adapter attached whereby a portable drill or the like can be inserted therein whereby the general framework can be used as a guide and the like which permits the drill to have the same wide range of movements that are afforded to the saw.

If only the drill 111 is to be used at a worksite, the saw motor can be removed, this makes the assembly very easy to transport.

Although the invention has been described relative to a preferred embodiment thereof, it will be appreciated by those skilled in the art that variations and modifications can be effected in the embodiment without departing from the scope and spirit of the invention.

I claim:

1. A portable radial arm machine having a working position and a collapsed non-operative transport position comprising:
   a stationary base having upper and lower planar surfaces affixed thereto;
   a work table secured against rotation with respect to said base and mounted to said upper surface;
   first standard receiving means rigidly fixed to said base;
   a standard having an upper end and a lower end;
   standard mounting means positioned near the lower end of said standard and being pivotally connected to said standard receiving means for receiving said standard and permitting said standard to be pivoted with respect to said base and said first standard receiving means;
   means for securing said standard mounting means to said first standard receiving means when said radial arm machine is in a working position and for permitting said standard mounting means to be repositioned with respect to said first standard receiving means when said radial arm machine is converted from the working position to the transport position;
   a radial arm having an inner end and a distal end, said inner end slidably received on said standard for vertical movement with respect to said work table when said radial arm machine is in a working position;
   a carriage slidably mounted on said radial arm for movement along said arm comprising
   a yoke,
   a cradle pivotally mounted to said yoke, and
   a saw and motor assembly removably attached to said cradle and lying outside the confines of said yoke; and
   second standard receiving means remote from said first standard receiving means and fixed to said base to secure said standard to said base when said radial arm machine is in the collapsed nonoperative transport position, wherein when said radial arm machine is in the working position said standard is positioned perpendicularly to said base and said work table, and when said radial arm machine is in the transport position said standard is positioned parallel to said base and said work table.

2. The machine of claim 1 wherein said first standard receiving means comprises a mounting plate.

3. The machine of claim 2 wherein said standard mounting means comprises a mounting plate.

4. The machine of claim 3 wherein a friction member is disposed between said mounting plates and said fastening and releasing means draws said plates toward one another to secure said standard to said base when said radial arm machine is converted to the working position.

5. The machine of claim 4 wherein said plates having apertures, the aperture of said first standard receiving means being threaded, and said fastening said releasing means is a threaded bolt extending through said aperture in said standard mounting means and threadably received by said aperture in said standard receiving means.

6. The machine of claim 1 wherein said second standard receiving means comprises a bracket and clip assembly.

7. The machine of claim 1 wherein said base comprises radial arm anchoring means to secure said radial arm to said base when said radial arm machine is in the transport position.

8. The machine of claim 7 wherein said radial arm anchoring means comprises a bracket jaw and screw assembly.

9. The machine of claim 7 wherein said second standard receiving means and said radial arm anchoring means are positioned on said base such that said standard and said radial arm are secured to said base in a position parallel to the plane of said work table.

10. The machine of claim 7 wherein said base comprises saw and motor assembly receiving means to secure said assembly to said base when said radial arm machine is in the transport position.

11. The machine of claim 1 wherein said standard comprises radial arm receiving means to fix said arm at a selected position along said standard.

12. The machine of claim 1 wherein said radial arm comprises carriage securing means to fix said carriage at a selected point along said arm.

13. The machine of claim 1 wherein said standard is comprised of first and second pillars.

14. The machine of claim 13 wherein a handle connects said first and second pillars.

15. The machine of claim 14 wherein a second handle is affixed to said base.

* * * * *